Jan. 5, 1926.                                1,568,808
W. E. DAVISON ET AL
FISHING TOOL
Filed Sept. 5, 1923
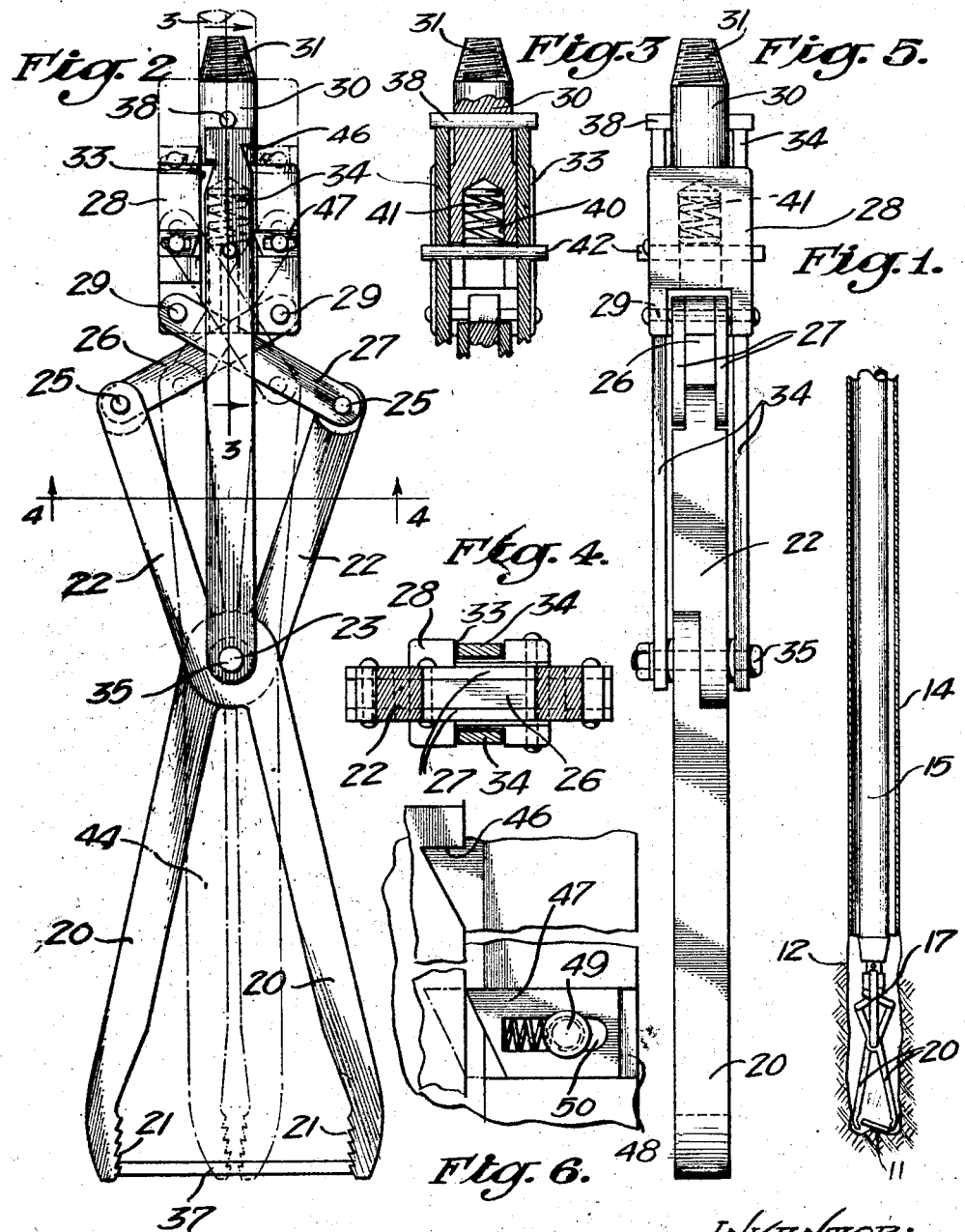
INVENTOR:
WILLIAM E. DAVISON
WILLIAM B. MARSHALL,
BY
Fred W. Kurrie
ATTORNEYS.

Patented Jan. 5, 1926.

1,568,808

UNITED STATES PATENT OFFICE.

WILLIAM E. DAVISON AND WILLIAM B. MARSHALL, OF FELLOWS, CALIFORNIA.

FISHING TOOL.

Application filed September 5, 1923. Serial No. 661,003.

*To all whom it may concern:*

Be it known that we, WILLIAM E. DAVISON and WILLIAM B. MARSHALL, both citizens of the United States, residing at Fellows, in the county of Kern, State of California, have invented a new and useful Fishing Tool, of which the following is a specification.

This invention relates to fishing tools employed in well drilling for removing articles from the hole being drilled.

In the drilling of wells, it often occurs that tools or portions thereof become lost in the hole and the presence thereof makes further drilling impossible. To proceed with the well it is necessary either to remove the article or to drill to one side of it, removing the article being the more practical method in most cases. Fishing tools are at present provided by which such articles are removed from the hole when the article is centralized upon the bottom thereof, but if the article to be removed is not absolutely central, it is often shoved to the sides in the attempt to grapple it with a fishing tool which makes the removal from the hole still more difficult.

The general object of our invention is to provide a fishing tool by means of which lost articles as above stated may be removed from the well hole in a minimum time and with a minimum expenditure of labor.

Another object of the invention is to provide a fishing tool of this character which will not have to be removed from the well and reset after each attempt to grapple a lost article.

The especial advantages of the invention and further objects thereof will be made evident hereinafter.

Referring to the drawings which are for illustrative purposes only:

Fig. 1 is a diagrammatic view illustrating the utility of the invention.

Fig. 2 is a side elevational view of a fishing tool embodying the features of our invention.

Fig. 3 is a vertical section taken on the line 3—3 of Fig. 2 showing the location of the jaw closing spring.

Fig. 4 is a horizontal section taken on the line 4—4 of Fig. 2.

Fig. 5 is an elevation of the fishing tool taken at right angles to Fig. 2.

Fig. 6 is an enlarged fragmentary detail illustrating the arrangement for controlling the relative movement between the head and the jaw members of the tool.

As shown in Fig. 1 of the drawings, a disc 11 is lost at the bottom of a well 12 in which a well casing 14 is being set. On the end of the tubing 15 is situated a fishing tool 17 which embodies the features of the invention, the fishing tool having jaws which will pass down around the disc 11 and will, when the tool is raised, be made to grasp the disc 11, raising it therewith to the surface.

In the other views of the drawing, the fishing tool 17 is shown in detail. The tool consists of a pair of jaw members 20 having jaws or teeth formations 21 at the lower ends, and having upper extensions 22, the jaw members 20 being hinged together at 23. Pivotally attached to the upper ends of the extensions 22 at 25 are crossed link members 26 and 27 which are also pivotally attached to the head 28 at 29 near the lower portion thereof, the link 26 being composed of a central piece and the link 27 being composed of two pieces which pass on each side of the link 26. The head 28 has an upwardly extending projection 30 which provides a pin 31 by which the tool 17 may be attached to the tubing. Slots 33 are provided in the head 28 through which vertical slide members 34 extend, the lower end of the slide members being attached to the members 20 by means of the pin 35 which also serves as the hinging pin for the jaw members 20.

When the fishing tool is being lowered to the bottom of the well, the jaw members are retained in open position by placing a suitable member 37 between the lower ends of the jaw members 20, the spreading of the jaws being limited by the engagement of the pin 38 extending through the projection 30, with the upper ends of the slides 34. Upon reaching the bottom of the well, the member 37 will be forced from place by coming into contact with the impediment there at and the jaws will be allowed to close around the object. As shown in Fig. 3, we provide a spring 40 situated in the bore 41 of the head 28, which spring exerts a downward pressure on the slides 34 through a pin 42 which extends through the slides 34. It will readily be seen that by moving the slide members 34 and likewise the jaw members 20 downwardly relative to the head 28, the jaws will be made to engage the object owing to the fact that distance between the point of hinging 23 of the jaw members 20 and the pivot points 29 of the links 26 and 27 is lengthened. This causes the angle formed by the extensions 22 and the links 26 and 27 to straighten; in other words, causes the upper ends of the extensions 22 to move inwardly which in turn, causes the jaws 21 to move inwardly and engage the object, an extreme contracted position of the jaws being indicated by the broken lines 44. The tool is then raised and the jaws will be made to grip the object very securely because the jaw members are then suspended at the pivots 25 and the weight thereof tends to cause the jaws to close. In event that the jaws slip off the object, the jaws will close and the head will move relatively upwardly until one of the notches 46 formed in one of the slides 34 is engaged by the corresponding dog 47 mounted on the head 28.

As shown in Fig. 6, the dogs 47 are slidably located in channels 48 being held therein by means of pins 49 which extend through the slots 50 in the dogs 47, springs 52 being provided to force the dogs into the corresponding notches 46 as they approach the dogs. By adjusting the pins 49, any of the dogs may be rendered inoperative.

In most types of fishing tools, it is necessary, in case the first attempt to grapple the object is unsuccessful, to elevate the tool to the surface and reset it before a second attempt can be made. In our tool, we obviate this elevating and resetting of the tool and consequently save a great deal of labor, time and money.

By lowering an impression block into the well, it is possible to obtain the exact size and position of the lost object. Suppose we find that the lost object is a drill disc five inches in diameter and lying flat on the bottom of the well. The jaws of the fishing tool are then adjusted so that they will close to four inches. This adjustment may be accomplished by bringing the dog 47 into operation which will allow the required relative movement between the head and the jaw members. In the drawing only two dogs have been shown, but any number of dogs may be provided. If the first attempt to grapple the disc is unsuccessful, the jaws will close to four inches which is an inch less than the diameter of the disc. The tool is raised about a foot and then is dropped down against the disc, the downward movement of the head 28 and links 26 and 27, causing the members 20 to be spread apart.

We claim as our invention:

1. In a fishing tool, the combination of: jaw members; pivot means hinging said jaw members together at an intermediate point; a head equipped with suspension means and having slide grooves in the sides thereof; links connecting between said head and the upper ends of said jaw members; and vertical slide bars arranged between said head and said jaw members for aligning said head and said jaw members, said bars being received in said slide grooves and joined to said pivot means.

2. In a fishing tool, the combination of: jaw members; pivot means hinging said jaw members together at an intermediate point; a head equipped with suspension means and having slide grooves in the sides thereof; links connecting between said head and the upper ends of said jaw members; vertical slide bars for aligning said head and said jaw members, said bars being received in said slide grooves and joined to said pivot means; and spring means carried by said head for forcing downwardly on said slide bars in a manner to move said head and said pivot means relatively apart thereby acting to close said jaw members.

3. In a fishing tool, the combination of: jaw members hinged together having jaws formed at the lower ends; a head having slots formed therein; link members movably connecting said jaw members and said head; slide members resting in said slots, the lower ends of said slide members being pivotally attached to said jaw members; a pin mounted in said head engaging said slide members when said head is in its lowest relative position; and dogs mounted on said head for limiting the highest relative position of said head.

4. In a fishing tool, the combination of: jaw members hinged together having jaws formed at the lower ends; a head having slots formed therein; link members movably connecting said jaw members and said head; slide members resting in said slots, the lower ends of said slide members being pivotally attached to said jaw members when said head is in its lowest relative position; dogs mounted on said head for limiting the highest relative position of said head; a spring mounted in said head for moving said head upward relatively to said jaw members; and a pin mounted in said head engaging said slide members.

5. In a fishing tool, the combination of: a pair of jaw members hinged together, said jaw members having jaw formations at the lower ends thereof; a head having slots formed therein; link members connecting said jaw members and said head in such a manner that a relative movement between said jaw members and said head will cause said jaws of said jaw members to open or close according to said relative movement; slide members pivotally attached to said jaw members at point of hinging and extending into said slots in said head; a pin located in said head and engaged by said slides when said head is in its lowest position relative to said jaw members; dogs for limiting the highest position relative to said jaw members; and a spring mounted in said head for retaining said head in its highest position relative to said jaw members.

6. In a fishing tool, the combination of: a pair of jaw members hinged together, said jaw members having jaw formations at the lower ends thereof; a head having slots formed therein; link members connecting said jaw members and said head in such a manner that a relative movement between said jaw members and said head will cause said jaws of said jaw members to open or close according to said relative movement; slide members pivotally attached to said jaw members at point of hinging and extending into said slots in said head; a pin located in said head and engaged by said slides when said head is in its lowest position relative to said jaw members; selectively operable dogs for limiting the highest position relative to said jaw members; and a spring mounted in said head for retaining said head in its highest position relative to said jaw members.

7. In a fishing tool, the combination of: a pair of jaw members hinged together, said jaw members having jaw formations at the lower ends thereof; a head having slots formed therein; link members connecting said jaw members and said head in such a manner that a relative movement between said jaw members and said head will cause said jaws of said jaw members to open or close according to said relative movement; slide members pivotally attached to said jaw members at point of hinging and extending into said slots in said head; a pin located in said head and engaged by said slide members when said head is in its lowest position relative to said jaw members; selectively operable dogs mounted on said head for limiting the highest position of said head relative to said jaw members, said dogs engaging notches in said slide members when said notches coincide with said dogs; and a spring mounted in said head for retaining said head in its highest position relative to said jaw members.

In testimony whereof, we have hereunto set our hands at Fellows, California, this 29 day of August, 1923.

WILLIAM E. DAVISON.
WILLIAM B. MARSHALL.